(12) United States Patent
Thompson et al.

(10) Patent No.: US 7,801,465 B2
(45) Date of Patent: Sep. 21, 2010

(54) CONDENSATE SEPARATION

(75) Inventors: John A. Thompson, Boise, ID (US);
Peter Gysling, New Plymouth, ID (US);
Bruce J. Jackson, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 537 days.

(21) Appl. No.: 11/830,844

(22) Filed: Jul. 30, 2007

(65) Prior Publication Data

US 2009/0035023 A1 Feb. 5, 2009

(51) Int. Cl.
*G03G 15/10* (2006.01)
*G03G 15/16* (2006.01)
(52) U.S. Cl. ...................... 399/250; 399/101
(58) Field of Classification Search ................. 399/250, 399/348, 359, 101, 327, 307; 210/805, 511, 210/767
See application file for complete search history.

(56) References Cited

U.S. PATENT DOCUMENTS

| | | | |
|---|---|---|---|
| 3,767,300 A | 10/1973 | Brown et al. | |
| 3,880,515 A | 4/1975 | Tanaka et al. | |
| 3,997,977 A | 12/1976 | Katayama et al. | |
| 4,462,675 A | 7/1984 | Moraw et al. | |
| 4,687,319 A | 8/1987 | Mishra | |
| 4,731,636 A | 3/1988 | Howe et al. | |
| 4,766,462 A | 8/1988 | Dyer et al. | |
| 5,287,123 A | 2/1994 | Medlin et al. | |
| 5,406,316 A | 4/1995 | Schwiebert et al. | |
| 5,708,938 A | 1/1998 | Takeuchi et al. | |
| 5,712,672 A | 1/1998 | Gooray et al. | |
| 5,737,674 A | 4/1998 | Venkatesan et al. | |
| 5,878,305 A | 3/1999 | Suzumuria et al. | |
| 6,308,626 B1 | 10/2001 | Crystal et al. | |
| 6,577,833 B2 | 6/2003 | Takahashi et al. | |
| 6,752,853 B2 | 6/2004 | Simpson et al. | |
| 6,856,778 B2 * | 2/2005 | Vejtasa et al. | 399/359 |
| 7,520,393 B2 * | 4/2009 | Driggers | 399/250 |
| 2003/0132996 A1 | 7/2003 | Adachi | |
| 2004/0071480 A1 * | 4/2004 | Vejtasa et al. | 399/250 |
| 2005/0212882 A1 | 9/2005 | Naniwa | |
| 2007/0108118 A1 * | 5/2007 | Driggers | |

* cited by examiner

*Primary Examiner*—Susan S Lee

(57) ABSTRACT

An ink carrier oil and water are separated from condensate. One embodiment includes first and second chambers for the separation. The first chamber receives the condensate and has an upper discharge outlet and a lower discharge outlet. The second chamber has an inlet connected to the lower outlet and a second chamber outlet below the upper discharge outlet such that separated carrier oil is discharged through the upper outlet. Separated water is discharged through the second chamber outlet. An interface between the separated carrier oil and water extends between the upper discharge outlet and the lower discharge outlet. In another embodiment, the carrier oil includes at least one of a high molecular weight oil, a lubricating oil and a defoamer. An additive having a lower concentration of the at least one of the high molecular weight oil, the lubricating oil and the defoamer is added to the carrier oil.

16 Claims, 6 Drawing Sheets

CONDENSATE SEPARATION

BACKGROUND

Some printers may attempt to condense ink vapors and to recycle portions of the condensate. Mechanisms for separating out such portions to be recycled may be complex, space consuming and expensive. Moreover, reuse of the recycled portions of the condensate may lessen print quality.

DETAILED DESCRIPTION OF THE EXAMPLE EMBODIMENTS

Figure 1:
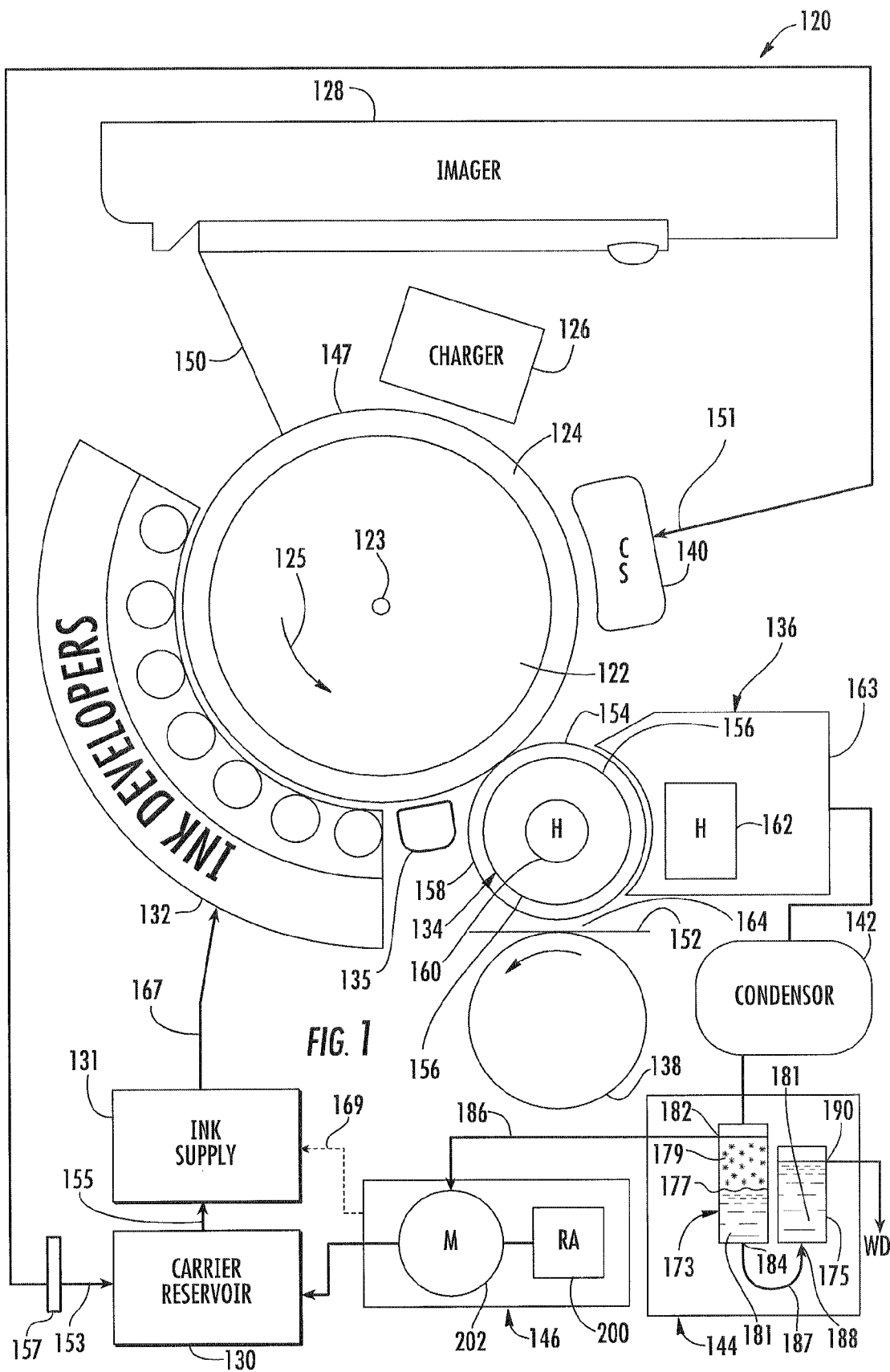
FIG. 1 is a schematic illustration of a printer according to an example embodiment.

FIG. 1 schematically illustrates imaging system or printer 120 according to an example embodiment. Printer 120 condenses ink vapors produced during printing and passively separates the condensate into an ink carrier oil and water to reduce complexity and cost. Printer 120 recycles or reuses the recovered ink carrier oil while substantially maintaining print quality.

Printer 120 comprises a liquid electrophotographic (LEP) printer. Printer 120, (sometimes embodied as part of an offset color press) includes drum 122, photoconductor 124, charger 126, imager 128, ink carrier oil reservoir 130, ink supply 131, developer 132, internally and/or externally heated intermediate transfer member 134, impression member 138, cleaning station 140, condenser 142, separator 144 and additive system 146. Drum 122 comprises a movable support structure supporting photoconductor 124. Drum 122 is configured to be rotationally driven about axis 123 in a direction indicated by arrow 125 by a motor and transmission (not shown). As a result, distinct surface portions of photoconductor 124 are transported between stations of printer 120 including charger 126, imager 128, ink developers 132, transfer member 134 and charger 134. In other embodiments, photoconductor 124 may be driven between substations in other manners. For example, photoconductor 124 may be provided as part of an endless belt supported by a plurality of rollers.

Photoconductor 124, also sometimes referred to as a photoreceptor, comprises a multi-layered structure configured to be charged and to have portions selectively discharged in response to optical radiation such that charged and discharged areas form a discharged image to which charged printing material is adhered.

Charger 126 comprises a device configured to electrostatically charge surface 147 of photoconductor 124. In one embodiment, charger 126 comprises a charge roller which is rotationally driven while in sufficient proximity to photoconductor 124 so as to transfer a negative static charge to surface 147 of photoconductor 124. In other embodiments, charger 126 may alternatively comprise one or more corotrons or scorotrons. In still other embodiments, other devices for electrostatically charging surface 147 of photoconductor 124 may be employed.

Imager 128 comprises a device configured to selectively electrostatically discharge surface 147 so as to form an image. In the example shown, imager 128 comprises a scanning laser which is moved across surface 147 as drum 122 and photoconductor 124 are rotated about axis 123. Those portions of surface 147 which are impinged by light or laser 150 are electrostatically discharged to form an image (or latent image) upon surface 147. In other embodiments, imager 128 may alternatively comprise other devices configured to selectively emit or selectively allow light to impinge upon surface 147. For example, in other embodiments, imager 128 may alternatively include one or more shutter devices which employ liquid crystal materials to selectively block light and to selectively allow light to pass to surface 147. In yet other embodiments, imager 128 may alternatively include shutters which include micro or nano light-blocking shutters which pivot, slide or otherwise physically move between a light blocking and light transmitting states.

Ink carrier reservoir 130 comprises a container or chamber configured to hold ink carrier oil for use by one or more components of printer 120. In the example illustrated, ink carrier reservoir 130 is configured to hold ink carrier oil for use by cleaning station 140 and ink supply 131. In one embodiment, as indicated by arrow 151, ink carrier reservoir 130 serves as a cleaning station reservoir by supplying ink carrier oil to cleaning station 140 which applies the ink carrier oil against photoconductor 124 to clean the photoconductor 124. In one embodiment, cleaning station 140 further cools the ink carrier oil and applies ink carrier oil to photoconductor 124 to cool surface 147 of photoconductor 124. For example, in one embodiment, cleaning station 140 may include a heat exchanger or cooling coils in ink care reservoir 130 to cool the ink carrier oil. In one embodiment, the ink carrier oil supply to cleaning station 140 further assists in diluting concentrations of other materials such as particles recovered from photoconductor 124 during cleaning.

After ink carrier oil has been applied to surface 147 to clean and/or cool surface 147, the surface 147 is wiped with an absorbent roller and/or scraper. The removed carrier oil is returned to ink carrier reservoir 130 as indicated by arrow 153. In one embodiment, the ink carrier oil returning to ink carrier reservoir 130 may pass through one or more filters 157 (schematically illustrated). As indicated by arrow 155, ink carrier oil in reservoir 130 is further supplied to ink supply 131. In other embodiments, ink carrier reservoir 130 may alternatively operate independently of cleaning station 140, wherein ink carrier reservoir 130 just supplies ink carrier oil to ink supply 131.

Ink supply 131 comprises a source of printing material for ink developers 132. Ink supply 131 receives ink carrier oil from carrier reservoir 130. As noted above, the ink carrier oil supplied by ink carrier reservoir 130 may comprise new ink carrier oil supplied by a user, recycled ink carrier oil or a mixture of new and recycling carrier oil. Ink. supply 131 mixes being carrier oil received from ink care reservoir 130 with pigments or other colorant particles. The mixture is applied to ink developers 132 as needed by ink developers 132 using one or more sensors and solenoid actuated valves (not shown).

In the particular example shown, the raw, virgin or unused printing material may comprise a liquid or fluid ink comprising a liquid carrier and colorant particles. The colorant particles have a size of less than 2 μ. In different embodiments, the particle sizes may be different. In the example illustrated, the printing material generally includes approximately 3% by weight, colorant particles or solids part to being applied to surface 147. In one embodiment, the colorant particles include a toner binder resin comprising hot melt adhesive.

In one embodiment, the liquid carrier comprises an ink carrier oil, such as Isopar, and one or more additional components such as a high molecular weight oil, such as mineral oil, a lubricating oil and a defoamer. In one embodiment, the printing material, including the liquid carrier and the colorant particles, comprises HEWLETT-PACKARD ELECTRO INK commercially available from Hewlett-Packard.

Ink developers 132 comprises devices configured to apply printing material to surface 147 based upon the electrostatic charge upon surface 147 and to develop the image upon surface 147. According to one embodiment, ink developers 132 comprise binary ink developers (BIDs) (commercially available from Hewlett-Packard) circumferentially located about drum 122 and photoconductor 124. Such ink developers are configured to form a substantially uniform 6 μ thick electrostatically charged film composed of approximately 20% solids which is transferred to surface 147. In yet other embodiments, ink developers 132 may comprise other devices configured to transfer electrostatically charged liquid printing material or toner to surface 147. In still other embodiments, developers 132 may be configured to apply a dry electrostatically charged printing material, such as dry toner, to surface 147.

Intermediate transfer member 134 comprises a member configured to transfer the printing material upon surface 147 to a print medium 152 (schematically shown). Intermediate transfer member 134 includes an exterior surface 154 which is resiliently compressible and which is also configured to be electrostatically charged. Because surface 154 is resiliently compressible, surface 154 conforms and adapts to irregularities in print medium 152. Because surface 154 is configured to be electrostatically charged, surface 154 may be charged so as to facilitate transfer of printing material from surface 147 to surface 154. In one embodiment, intermediate transfer member 134 may include a drum 156 and an external blanket 158. Drum 156 supports blanket 158 which provides intermediate transfer member 134 with surface 154. In other embodiments, intermediate transfer member 134 may have other configurations. For example, in other embodiments, intermediate transfer member 134 may alternatively comprise an endless belt supported by a plurality of rollers in contact with or in close proximity to surface 147.

Heating system 136 comprises one or more devices configured to apply heat to printing material being carried by surface 154 from photoconductor 124 to medium 152. In the example illustrated, heating system 136 includes internal heater 160, external heater 162 and vapor collection plenum 163. Internal heater 160 comprises a heating device located within drum 156 that is configured to emit heat or inductively generate heat which is transmitted to surface 154 to heat and dry the printing material carried at surface 154. External heater 162 comprises one or more heating units located about transfer member 134. According to one embodiment, heaters 160 and 162 may comprise infrared heaters.

Heaters 160 and 162 are configured to heat printing material to a temperature of at least 85° C. and less than or equal to about 110° C. In still other embodiments, heaters 160 and 162 may have other configurations and may heat printing material upon transfer member 134 to other temperatures. In particular embodiments, heating system 136 may alternatively include one of either internal heater 160 or external heater 162.

Vapor collection plenum 163 comprises a housing, chamber, duct, vent, plenum or other structure at least partially circumscribing intermediate transfer member 134 so as to collect or direct ink or printing material vapors resulting from the heating of the printing material on transfer member 134 to condenser 142. In one embodiment, the vapor largely comprises the liquid carrier and water. Such water may be the result of humidity in the air. To a large extent, the colorant particles portion of the printed material do not vaporize, but remain upon member 134 for subsequent transfer to the print medium 152. Although not illustrated, in some embodiments, vapor collection system 163 may additionally include one or more blowers for moving the captured vapors to condenser 142.

Impression member 138 comprises a cylinder adjacent to intermediate transfer member 134 so as to form a nip 164 between member 134 and member 138. Medium 152 is generally fed between transfer member 134 and impression member 138, wherein the printing material is transferred from transfer member 134 to medium 152 at nip 164. Although impression member 138 is illustrated as a cylinder or roller, impression member 138 and alternatively comprise an endless belt or a stationary surface against which intermediate transfer member 134 moves.

Cleaning station 140 comprises one or more devices configured to remove any residual printing material from photoconductor 124 prior to surface areas of photoconductor 124 being once again charged at charger 126. In one embodiment, cleaning station 140 may comprise one or more devices configured to apply a cleaning fluid to surface 147, wherein residual toner particles are removed by one or more is absorbent rollers. In one embodiment, cleaning station 140 may additionally include one or more scraper blades. In yet other embodiments, other devices may be utilized to remove residual toner and electrostatic charge from surface 147.

Condenser 142 (schematically shown) comprises one of our structures configured to condense the collected vapor into a liquid. In one embodiment, condenser 142 includes one or more coils, fins or the like which are cooled or through which a cooled fluid flows at a sufficiently low temperatures such that the vapor condenses and is collected as a liquid. The condensed liquid, condensate, largely comprises the liquid carrier and water. The condensate is further directed to separator 144 for separation.

Separator 144 comprises a device by which the condensate received from condenser 142 is separated into ink carrier oil, such as Isopar, and water. In the example illustrated, separator 144 separates the condensate into such components in a passive manner, generally without pumps, sensors, floats, switches and the like, which would increase the cost and complexity of separator 144. In contrast, separator 144 utilizes specifically configured chambers having appropriate located inputs and outputs based upon specific gravities of the ink carrier oil and water to maintain an interface between the ink carrier oil and water and to control discharge of such fluids from separator 144.

As schematically shown by FIG. 1, separator 144 includes separation chamber 173 and water chamber 175. Separation chamber 173 comprises a container, receptacle or other volume defining structure configured to receive condensate from condenser 142, wherein the condensate separates into the ink carrier oil and the water within chamber 173 along an interface 177. As schematically represented by FIG. 1, the ink carrier oil 179 floats above the water 181 due to its lower specific gravity.

As further shown by FIG. 1, chamber 173 has an upper discharge outlet 182 and a lower discharge outlet 184. Outlet 182 may comprise an opening through a side wall of chamber 173 or may comprise an opening above an upper edge of the side wall of chamber 173 over which fluid may flow. Outlet 184 may comprise an opening through a side wall of chamber 173 or through a floor of chamber 173. Outlet 184 may be flush with either the side wall or the floor of chamber 173 or may be defined by a tube or port that projects beyond the side wall or floor of chamber 173. As schematically represented by arrow 186, outlet 182 is fluidly coupled to an additive system 146. As schematically represented by arrow 187, outlet 184 is fluidly coupled to water chamber 175. For purposes of this disclosure, the term "fluidly coupled" means that two structures defining a volume or passage for containing fluid are directly or indirectly connected to one another by one or more intervening volume or passage defining structures (conduits, tubing, pipes, chambers, receptacles and the like) such that fluid may flow between the two structures in at least one direction.

Chamber 175 comprises a container, receptacle or other volume defining structure configured to receive separated water from chamber 173. Chamber 175 includes inlet 188 and the second chamber outlet 190. Inlet 188 is fluidly coupled to outlet 184. Second chamber outlet 190 is located above the inlet 188, is located below upper discharge outlet 182 and is fluidly coupled to a water drain WD. Inlet 188 may comprise an opening through a side wall of chamber 175 or through a floor of chamber 175. Inlet 188 may be flush with either the side wall or the floor of chamber 175 or may be defined by a tube or port that projects beyond the side wall or floor of chamber 175. Outlet 190 may comprise an opening through a side wall of chamber 175 or may comprise an opening above an upper edge of the side wall of chamber 175 over which fluid may flow.

Because second chamber outlet 190 is vertically located between outlets 182 and 184 of chamber 173 and because the water 181 has a higher specific gravity as compared to the ink carrier oil 179, the vertical positioning of interface 177 between the water 181 and the ink carrier oil 179 in chamber 173 is controlled and maintained passively, without relying upon floats, switches, valves and the like which would otherwise add cost and complexity to separator 144. As new condensate is added to chamber 173 from condenser 142, appropriate amounts of water are discharged through outlet 190 and appropriate amounts of ink carrier oil 171 are discharged through outlet 182, automatically, to maintain the positioning of interface 177 between outlet 182 and outlet 184, inhibiting water 181 from being discharged through outlet 182 or oil 179 from being discharged through outlet 184 into water chamber 175.

Additive system 146 comprises a system configured to add or mix an additive with the separated ink carrier oil 179. Additive system 146 includes recycling additive supply 200 and mixer 202. Additive supply 200 comprises a supply of additives for addition to the ink carrier oil 179 recovered from the condensate. Such additives generally replace those materials or fluids of the liquid carrier of the printing material initially applied to photo conductor 124 but which were left behind or consumed during printing such as by being left on photoconductor 124 and cleaned by cleaning station 140, such as by being left upon or absorbed by intermediate transfer member 134 or such as by being applied to medium 152. In the example illustrated, recycling additive supply 200 includes at least one of a high molecular weight oil, a lubricating oil and a defoamer. In the example illustrated, recycling additive supply 200 includes each of a high molecular weight oil, a heavy oil and a defoamer. In one embodiment, the lubrication oil may comprise a silicone oil. In one embodiment, the high molecular weight oil has a molecular weight greater than Isopar. In one embodiment, the high molecular weight oil comprises mineral oil.

Recycling additive supply 200 includes one or more devices for metering such additives to mixer 202. According to one embodiment, recycling additive supply 200 meters or dispenses such additives with respect to oil 179 such that the high molecular weight oil, a lubricating oil and a defoamer each have a lower concentration with respect to oil 179 then the original concentration of such additives with respect to the ink carrier oil in the original unused or virgin printing material supplied by ink supply 131. It has been discovered that such additives, over time, build up in printer 120 and detrimentally affect performance of printer 120 in the resulting print quality of printer 120. Because such additives are dispensed or metered at a lower concentration as compared to the concentration of the original unused or virgin printing material supplied by ink supplied 129, performance of printer 120 is maintained for a prolonged time. In other embodiments, recycling additive supply 200 may dispense such additives at other concentration levels.

Mixer 202 comprises a device configured to mix the received oil 186 and recycling additives from recycling additive supply 200 together.

Ink developers 132 develop an image upon surface 147 by applying electrostatically charged ink having a negative charge. Once the image upon surface 147 is developed, charge eraser 135, comprising one or more light emitting diodes, discharges any remaining electrical charge upon such portions of surface 147 and ink image is transferred to surface 154 of intermediate transfer member 34. In the example shown, the printing material formed comprises and approximately 1.0 µ thick layer of approximately 90% solids color or particles upon intermediate transfer member 134.

Heating system 136 applies heat to such printing material upon surface 154 so as to evaporate the carrier liquid of the printing material and to melt toner binder resin of the color and particles or solids of the printing material to form a hot melt adhesive. Thereafter, the layer of hot colorant particles forming an image upon surface 154 is transferred to medium 152 passing between transfer member 134 and impression member 138. In the embodiment shown, the hot colorant particles are transferred to print medium 152 at approximately 90° C. The layer of hot colorant particles cool upon contacting medium 152 on contact in nip 164.

These operations are repeated for the various colors or preparation of the final image to be produced upon medium 152. In other embodiments, in lieu of creating one color separation at a time on a surface 154, sometimes referred to as "multi—shot" process, the above process may be modified to employ a one-shot color process in which all color separations are layered upon surface 154 of intermediate transfer member 134 prior to being transferred to and deposited upon medium 152.

Figure 2:
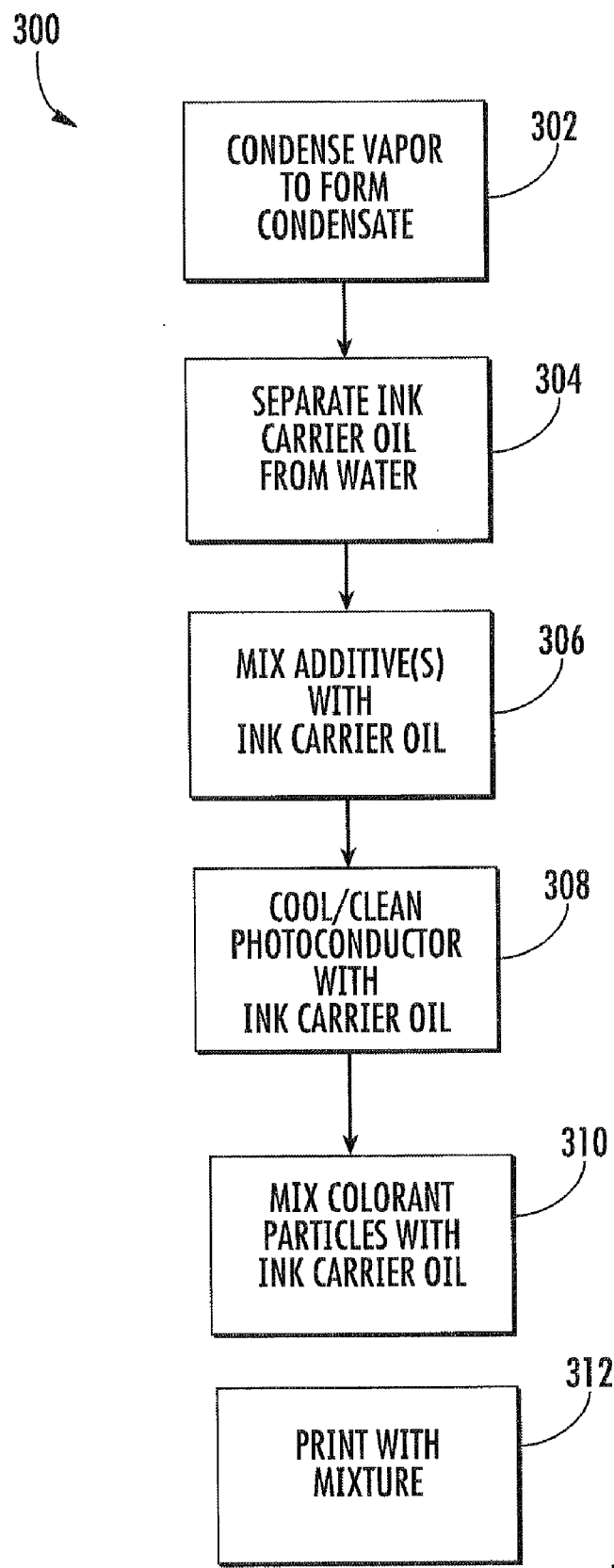
FIG. 2 is a flow chart of a process for separating and reusing portions of vapor according to an example embodiment.

FIG. 2 outlines a process 300 for recycling ink. and vapors recovered from printer 120. As indicated by step 302, the vapor provided by condenser 142 is condensed to form a condensate. The condensate includes the ink carrier oil, such as Isopar, and water. As indicated by step 304, the ink carrier oil is separated from the water. In one embodiment incoming carrier oil is separated from the water by a passive separator, such as separator 144. In other embodiments, other separations systems may be employed.

As indicated by step 306, the separated ink carrier oil is then mixed with additives. Such additives include high molecular weight oil, a lubricating oil and a defoamer. The high molecular weight oil increases the transfer blanket life. The lubricating oil facilitates separation of the colorant particles from intermediate transfer member 134 to medium 152. The defoamer reduces foaming of the fluid printing material as it is being transferred and applied by ink developers 132 and as it is being transferred from photoconductor 124 to intermediate transfer member 134. In one embodiment, the high molecular weight oil, the lubricating oil and the defoamer are each added at concentrations lower than the concentration of such materials in the original unused printing material. Consequently, undesirable buildup of such additive materials within the printer are reduced or avoided.

As indicated by step 308, the ink carrier oil with additives is applied to cleaning station 140 (shown in FIG. 1) to clean and/or cool photoconductor 124. Oil recovered from photoconductor 124 is also supplied back to reservoir 130 and may be further transferred to ink supply 131 for printing. In other embodiments, step 308 may be omitted where recycled ink carrier oil is not supplied to cleaning station 140 for cleaning/cooling or dilution. As indicated by step 310, colorant particles are mixed with the ink carrier oil at ink supply 131 (shown in FIG. 1). As indicated by step 312, the resulting mixture is reused to print one or more images.

Figure 3:
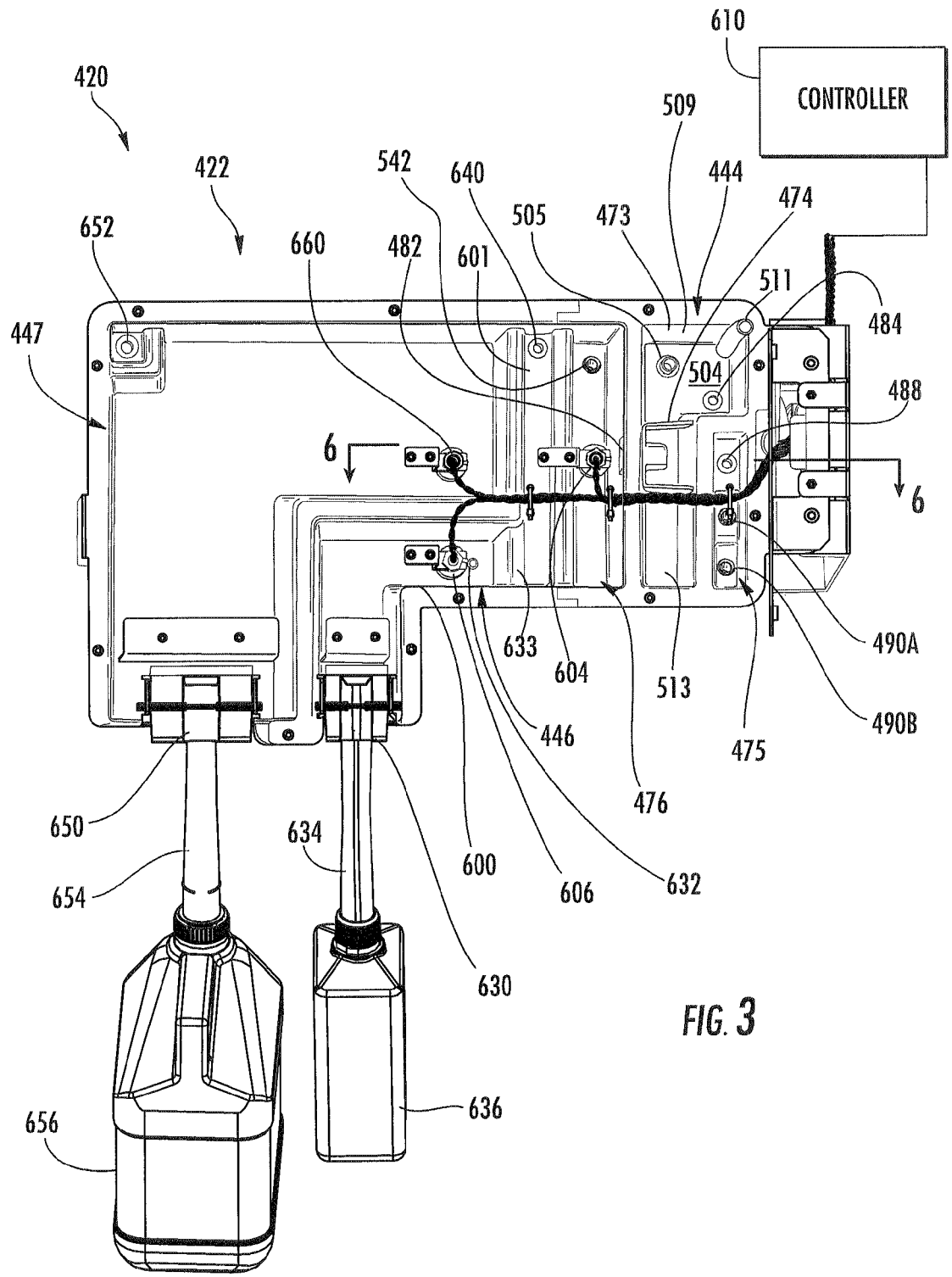
FIG. 3 is a top perspective view of another embodiment of the printer of FIG. 1 according to an example embodiment.
Figure 4:
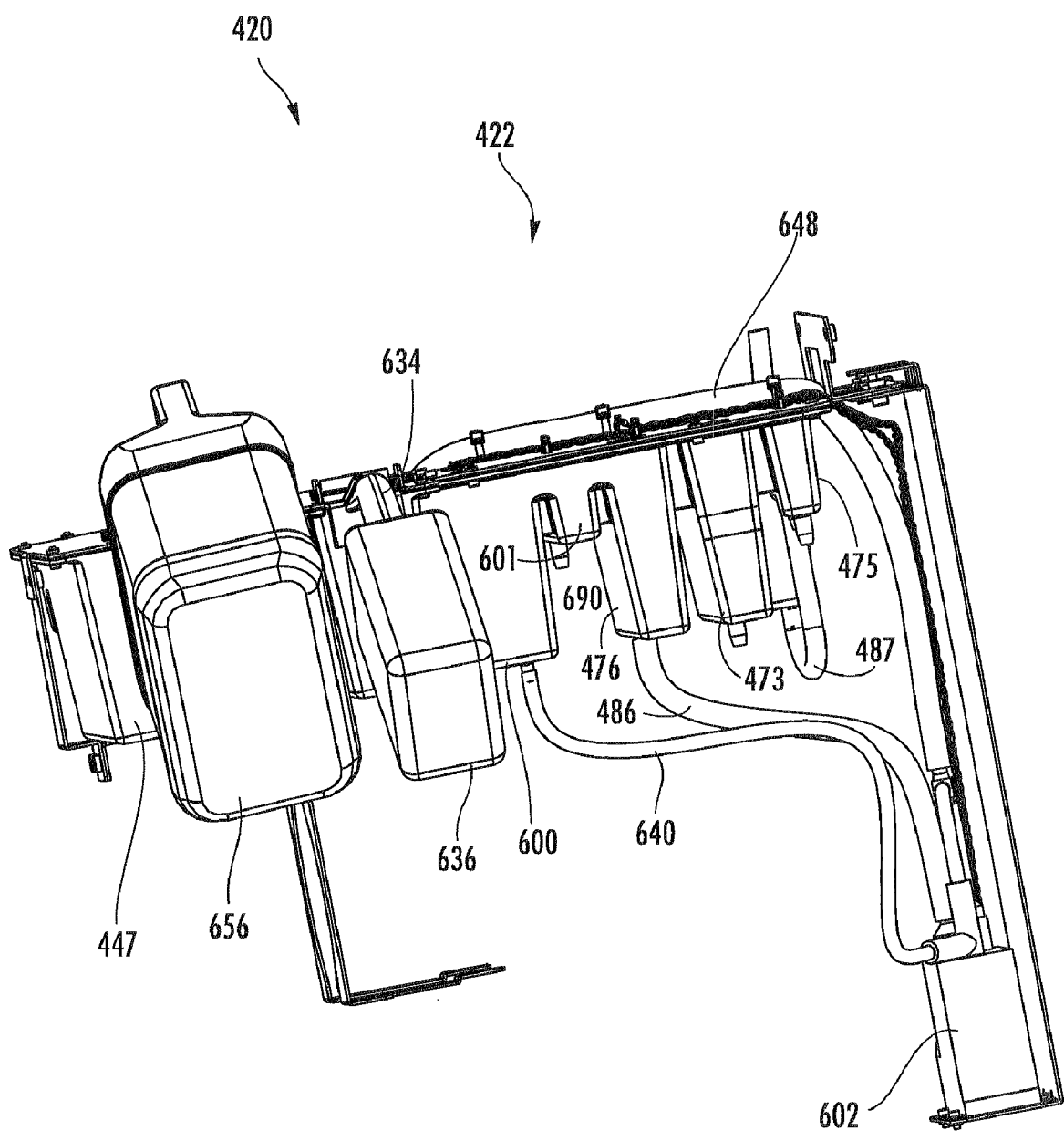
FIG. 4 is a side perspective view of the printer of FIG. 3 according to an example embodiment.

FIGS. 3 and 4 illustrate printer 420, another embodiment of printer 120. Printer 420 is a substantially identical to printer 120 except that printer 420 includes reclamation system 422 in addition to the separator 144 and additive system 146. All of the remaining elements of printer 420 are shown and described above with respect to printer 120. In particular, although not shown in FIG. 3, printer 420 includes drum 122, photoconductor 124, charger 126, imager 128, ink carrier reservoir 130, ink supply 131, developer 132, intermediate transfer member 134, heating system 136, impression member 138, cleaning station 140, and condenser 142, each of which is shown in FIG. 1.

As shown by FIGS. 3-6, reclamation system 422 includes separator 444, additive system 446 and supplemental fill chamber 447. Like separator 144, separator 444 comprises a device by which the condensate received from condenser 142 is separated into ink carrier oil, such as Isopar, and water. In the example illustrated, separator 144 separates the condensate into such components in a passive manner, generally without pumps, sensors, floats, switches and the like, which would increase the cost and complexity of separator 444. In contrast, separator 444 utilizes specifically configured chambers having appropriate located inputs and outputs based upon specific gravities of the ink carrier oil and water to maintain an interface between the ink carrier oil and water and to control discharge of such fluids from separator 444.

Figure 5:
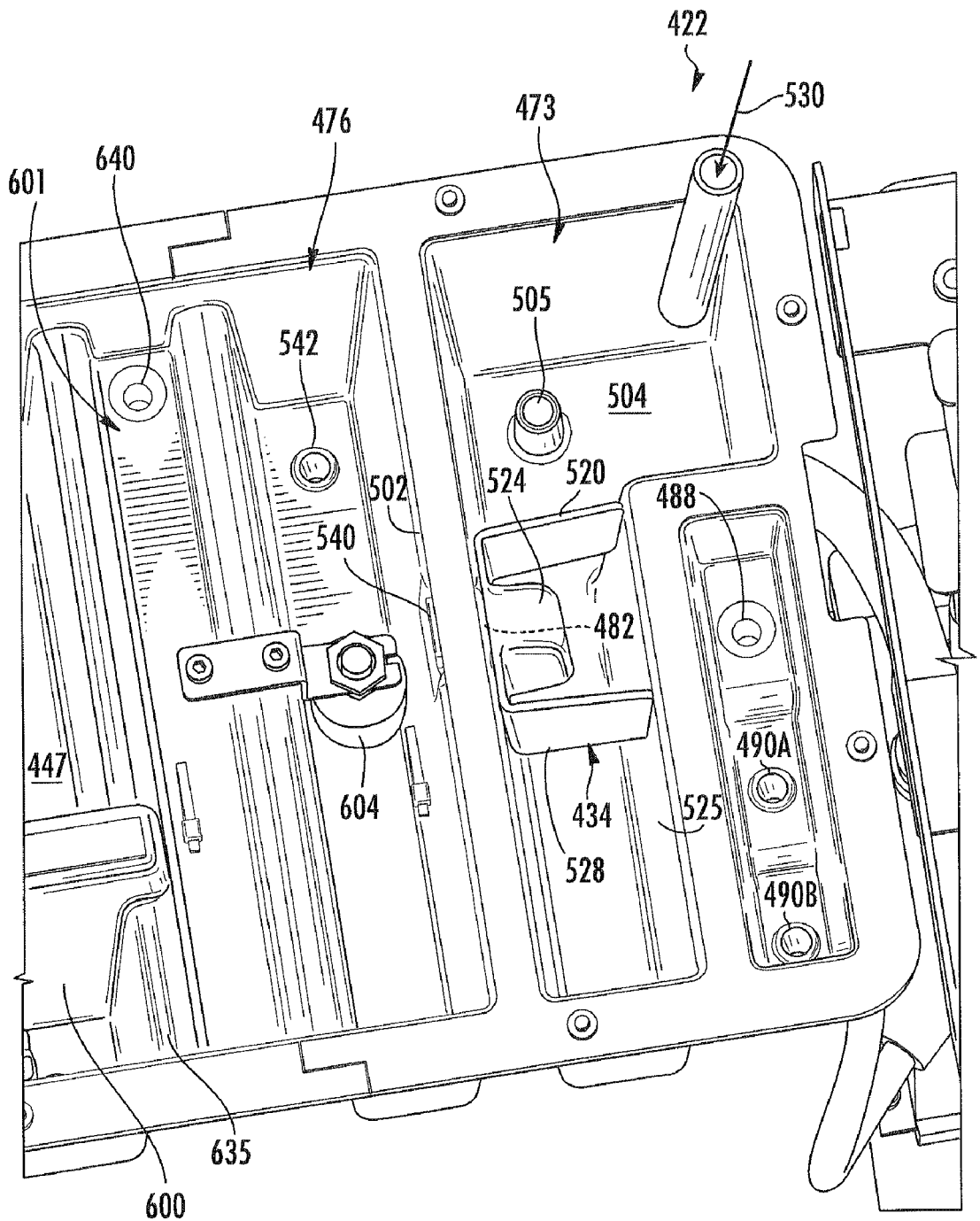
FIG. 5 is an enlarged fragmentary perspective view of the printer of FIG. 3 according to an example embodiment.
Figure 6:
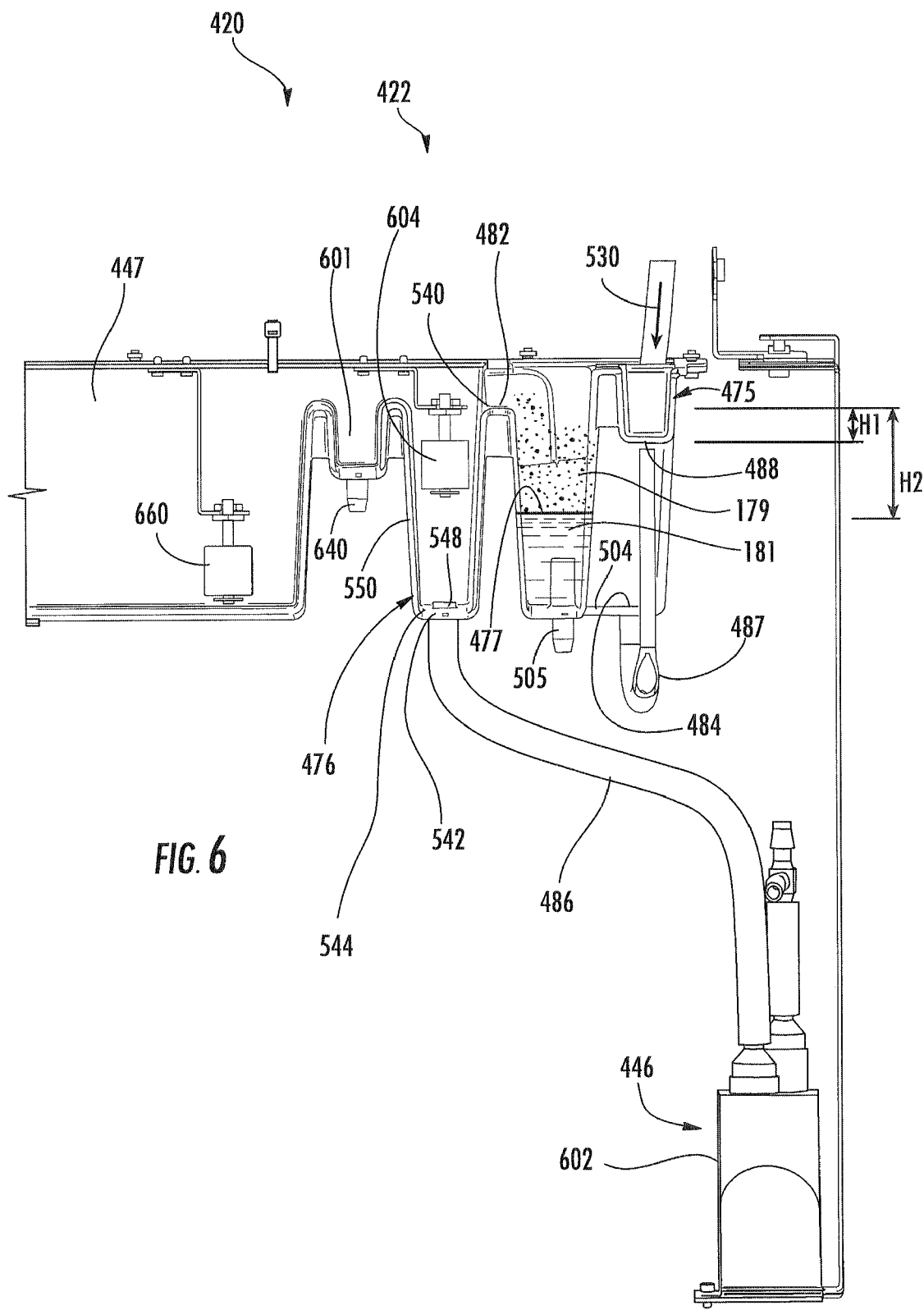
FIG. 6 is a sectional view of the printer of FIG. 3 taken along a line 6-6 according to an example embodiment.

As shown by FIG. 3, separator 444 includes separation chamber 473, baffle 474, water chamber 475, and oil chamber 476. Separation chamber 473 comprises a container, receptacle or other volume defining structure configured to receive condensate from condenser 142 (shown in FIG. 1), wherein the condensate separates into the ink carrier oil and the water within chamber 473. As shown by FIGS. 5 and 6, chamber 473 includes upper discharge outlet 482 (shown in FIGS. 5 and 6), lower discharge outlet 484 (shown in FIG. 3) and auxiliary drain port 505. Outlet 482 comprises an opening or cut out through the side wall 502 between chamber 473 and chamber 476 through which fluid may flow. In other embodiments, outlet 482 may comprise an opening or rollover over the side wall between chamber 473 in chamber 476.

Outlet 484 comprises an opening through a floor 504 of chamber 473. Outlet 484 is flush the floor 504 of chamber 473. In other embodiments, outlet 484 may extend through wall 502. In other embodiments, outlet 484 may be defined by a tube or port that projects beyond the water chamber 475. As shown by FIGS. 4 and 6, outlet 484 is fluidly connected to water chamber for 75 by a hose or other fluids conduit 487.

As shown by FIG. 3, separation chamber 473 has an enlarged portion 509 in which condensate is received from condenser 142 (shown in FIG. 1) via a hose or other fluids conduit 511 and a narrower more constricted portion 513 adjacent to outlet 482. Because portion 509 is enlarged, portion 509 is better able to receive condensate from hose 584 situated above the level of fluid contained within chamber 473. In other embodiments, chamber 473 may have other shapes or configurations. Moreover, drain port 505 may be omitted.

Baffle 474 comprises a structure at least partially located within chamber 473 and configured to reduce splashing or waves of fluid within chamber 473. As shown by FIG. 5, baffle 474 mounts within opening 482 and includes a pair of spaced baffle plates 520 and an intermediate fluid duct 524. Baffle plates 520 project from wall 502 in a direction across chamber 473. In the example illustrated, baffle plates 520 extend substantially across chamber 473 to an interior wall 525 of chamber 473.

Duct 524 is located between plates 520 and opens in a downward direction towards floor 504 of chamber 473. Duct 524 forms a fluid passage which extends upward from the floor 504 and then turns so as to extend horizontally through side wall 502 and through outlet 482. Baffle 474 reduces waves and splashing of fluid within chamber 473 and reduces the likelihood of water or contaminants undesirably splashing and passing through opening 482 into chamber 476. Baffle 474 facilitates mounting or supporting of reclamation system 422 in a portion of printer 400 that may be subject to motion, such as in or along a door of printer 400. As a result, baffle 474 enables printer 420 to have a more versatile and potentially compact layout or architecture.

Water chamber 475 comprises a container, receptacle or other volume defining structure configured to receive separated water from chamber 473 and to controllably discharge the water to a water drain or other water recipient. Chamber 175 includes inlet 488 and outlets 490A and 490B (collectively referred to as outlets 490). Inlet 488 is fluidly coupled to outlet 484 by conduit 487. Inlet 488 comprises an opening through floor 508 of chamber 475. Inlet 188 is flush with the floor 508 of chamber 475. In other embodiments, inlet 488 may extend through side wall 510 or may be defined by a tube or port that projects beyond the side wall 510 or floor 508 of chamber 475. Outlets 490 comprise ports through which water may be drained to a drain via a hose or to a collection container.

As shown in FIG. 6, a cross-section of FIG. 3, condensate received by chamber 473 separates in chamber 473 along interface 477. The ink carrier oil 179 floats above the water 181 due to its lower specific gravity. Because inlet 488 is vertically located between outlets 482 and 484 of chamber 473 and because the water 181 has a higher specific gravity as compared to the ink carrier oil 179, the vertical positioning of interface 477 between the water 181 and the ink carrier oil 179 in chamber 473 is controlled and maintained passively, without relying upon floats, switches, valves and the like which would otherwise add cost and complexity to separator 444. As new condensate is added to chamber 473 from condenser 142 (shown in FIG. 1), appropriate amounts of water are discharged through outlet 484 to chamber 475 and appropriate amounts of ink carrier oil 471 are discharged through outlet 482 to chamber 476, automatically, to maintain the positioning of interface 477 between outlet 482 and outlet 484, inhibiting water 181 from being discharged through outlet 482 or oil 179 from being discharged through outlet 484 into water chamber 475.

As further shown by FIG. 6, inlet 488 is located at a distance $H_1$ below outlet 482. As a result, interface 477 is located at a distance $H_2$ below outlet 482. In particular, the distance $H_2$ is equal to $H_1/(1$—the specific gravity of oil 179). In one example embodiment, the ink carrier oil comprises Isopar having a specific gravity of approximately 0.75 such that $H_2$ is approximately equal to four times the distance of $H_1$. The same relative distances are also achieved with separator 144 described above with respect to FIG. 1.

As indicated by arrow 530 in FIG. 5, condensate from condenser 142 (shown in FIG. 1) is dropped into chamber 473 from above outlet 482. The level of interface 477 is controlled or chosen such that condensate 532 initially drops through oil 179 and interacts with interface 477. In particular, condensate 532 has sufficient force to break up any gel that may form along interface 477 to a sufficient extent such that interface 477 does not solidify or block movement of oil 179 and water 181. In other embodiments, condensate 532 may alternatively be supplied to chamber 473 in other fashions. For example, in other embodiments, condensate 532 may be passed through a tube having an opening below interface 477, wherein the oil 179 bubbles up through water 181 and across interface 477.

Oil chamber 476 comprises a container, receptacle or other volume defining structure configured to receive separated oil from chamber 475 and to controllably discharge the oil. Chamber 476 includes inlet 540 and outlet 542. Inlet 540 is fluidly coupled to outlet 482. Outlet 542 is located below inlet 540. In the example illustrated, outlet 542 comprises an opening through floor 544 of chamber 476. In particular, outlet 542 is defined by a tube 548 elevated above floor 544. As a result, sediment may collect along floor 544 without passing through outlet 542. In other embodiments, outlet 542 may be flush with the floor 544 of chamber 476. In other embodiments, outlet 542 may extend through side wall 550. Recycled or reclaimed oil discharged from chamber 476 through outlet 542 passes through a hose or other fluid conduit by 486 to additive system 446.

Additive system 446 comprises a system configured to add or mix an additive with the separated ink carrier oil 179. Additive system 446 includes recycling additive supply chamber 600, overflow channel 601, mixer 602, sensors 604, 606 and controller 610. Additive supply chamber 600 comprises a container, receptacle or other volume defining structure configured to receive and store a supply of additives for addition to the ink carrier oil 179 recovered from the condensate. Such additives generally replace those materials or fluids of the liquid carrier of the printing material initially applied to photo conductor 124 but which were left behind or consumed during printing such as by being left on photoconductor 124 and cleaned by cleaning station 140, such as by being left upon or absorbed by intermediate transfer member 134 or such as by being applied to medium 152. In the example illustrated, recycling additive supply 200 includes at least one of a high molecular weight oil, a lubricating oil and a defoamer. In the example illustrated, recycling additive supply 200 includes each of a high molecular weight oil, a lubricating oil and a defoamer.

As shown by FIG. 3, chamber 600 includes a fill port 630 and an outlet 632. Fill port 630 comprises an opening through chamber 600 is filled with additives. In the example illustrated, port 630 is configured to receive additives via a funnel 634 from an additive container 636. In the example illustrated, port 630 has an opening with a shape corresponding to the shape of funnel 634 to reduce the likelihood of fluids, other than additives, being deposited in chamber 600. For example, in one embodiment, funnel 634 has a triangular outer shape while port 630 has a triangular shaped opening. In other embodiments, the specific keying arrangement may be omitted.

Outlet 632 comprises an opening through which additives are discharged from chamber 600. As shown by FIG. 4, additives withdrawn from chamber 600 pass through a hose or other fluid conduit 642 mixer 602. As shown by FIG. 4, such discharge is by gravity flow. In other embodiments, pumps may alternatively be used to withdraw additives.

Overflow channel 601 comprises a channel or other container connected to chamber 600 by a lower rollover portion 633 located near a top of chamber 600. Rollover portion 633 permits excess additives to flow into channel 601 and through a discharge port 640 in channel 601. Channel 601 reduces the likelihood of overfilling of chamber 600.

Mixer 202 comprises a device configured to mix the received oil 179 (shown in FIG. 6) and recycling additives from recycling additive supply chamber 600 together. In the example illustrated, mixer 602 includes one or more devices for metering such additives and oil from chamber 476 to mixer 202. According to one embodiment, mixer 602 meters or dispenses such additives with respect to oil 179 such that the high molecular weight oil, a lubricating oil and a defoamer each have a lower concentration with respect to oil 179 then the original concentration of such additives with respect to the ink carrier oil in the original unused or virgin printing material supplied by ink supply 131 (shown in FIG. 1). It has been discovered that such additives, over time, build up in printer 420 and detrimentally affect performance of printer 120 in the resulting print quality of printer 420. Because such additives are dispensed or metered at a lower concentration as compared to the concentration of the original unused or virgin printing material supplied by ink supply 131, performance of printer 420 is maintained for a prolonged time. In other embodiments, mixer 602 may mix such additives with oil 179 at other concentration levels. In another embodiment, such metering devices may alternatively be associated with chambers 476 and 600.

Sensors 604 and 606 sense or detects levels of fluid within chambers 476 and 600, respectively. Signals from sensors 604 and 606 are used by controller 610 to direct and its metering devices. For example, signals from sensors 604 and 606 are used by controller 610 to direct mixer 602 two this charter withdrawal oil 179 from chamber 476. Signals from sensor 606 are used by controller 610 to notify a user when a supply of additives may be running low or may be empty.

Controller 610 comprises one or more processing units configured to direct operation of mixer 602 and its metering components. Controllers extend my further receive commands from a user via a user interface (touchpad, touch screen, buttons and the like), facilitating adjustment of the mixture of additives in oil. In another embodiment, controller 610 may automatically adjusts relative concentrations based upon input received from other sensors associate with printer 420.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 610 may be embodied as part of one or more application-specific integrated circuits (ASICs). Unless otherwise specifically noted, the controller is not limited to any specific combination of hardware circuitry and software, nor to any particular source for the instructions executed by the processing unit.

Supplemental fill chamber 447 comprises a container, receptacle or other volume defining structure configured to receive the mixture of additives and recycled or reclaimed oil from additive system 446. As shown by FIG. 4, chamber 447 receives the mixed oil and additives from mixer 602 via a hose or other fluid conduit 648. As shown by FIG. 3, chamber 447 includes a fill port 650 and outlet 652. Fill port 650 comprises an opening through which chamber 447 is filled with new or virgin oil including both ink carrier oil and at least some of the noted additives. Port 650 facilitates the addition of such new oil in those instances when the reclaim to recite that oil plus additives is insufficient to satisfy the demands of cleaning station 140 or ink developers 132 (shown in FIG. 1) of printer 420. In the example illustrated, port 630 is configured to receive new oil via a funnel 654 from an oil container 656. In the example illustrated, port 650 has an opening with a shape corresponding to the shape of funnel 654 to reduce the likelihood of fluids, other than additives, being deposited in chamber 447. In particular, port 650 has an opening with a shake distinct from the opening of port 630 to reduce the likelihood of additives being directly input to chamber 447. In one embodiment, funnel 654 has a circular outer shape while port 650 has a circular shaped opening. In other embodiments, this specific keying arrangement may have other mating shapes or may be omitted.

Outlet 652 comprise an opening through which imaging oil comprising either new imaging oil, recycled ink carrier oils and additives, or mixtures thereof, is supplied to ink carrier reservoir 130. As shown by FIG. 3, in the example illustrated, chamber 447 has an associated sensor 660 configured to sense the level of fluid within chamber 447. Signals from sensor 660 are used by controller 610. In particular, signals from sensors 660 are used by controller 610 to provide information regarding the level of fluid within chamber 447 to a user. In other embodiments, sensor 660 may be omitted. In other embodiments, chamber 447 may be omitted, wherein recycled oil and additives from mixer 602 are directly supplied to reservoir 130 (shown in FIG. 1).

As shown by FIGS. 3-6, reclamation system 422 as a single integral unitary structure or body which provides each of chambers 473, 475, 476, 600, 601 and 447. As a result, reclamation system 422 may be more compact, less complex and less expensive to fabricate. Although each of such chambers is illustrated as being integrally formed as part of a single unitary body with the other chambers, in other embodiments, a fewer of such chambers may be formed together. For example, in another embodiment, chambers 447, 600 and 601 may be provided by separate chambers or containers. Although not illustrated, in one embodiment, each of such chambers is covered by one or more removable covers.

Overall, separators 144, 444 provide printers 120 and 420 with efficient and less complex separation of received condensate into the ink carrier oil and the water. Additives system 146 further facilitate reuse of the ink carrier oil without degrading print quality by mixing in additives such as high molecular weight oil, lubricating oil and/or defoamers. Additive systems 146 and 446 increase the useful life of the printer and maintains print quality by adding in such additives at lower concentrations as compared to unused printing material, preventing undesirable buildup of such additives in the printer.

Although separators 144, 444 and additive systems 146, 446 have been illustrated as being employed as part of printers 120 and 420, in other embodiments, separators or 144, 444 and additive system 146 may be employed in other printers. For example, separators 144, 444 and additive system 146 may be employed in a printer using other ink developers or in another printer in which an electrostatic image or electrostatic latent image is formed upon a surface in other manners other than use of imager 128. Likewise, although separators 144, 444 and additive systems 146, 446 are illustrated as being used together, in other embodiments, separators 144, 444 and additive systems 146, 446 may be employed independent of one another. For example, separators 144, 444 may be employed with a different additive system and additive systems 146, 446 may employed with a different separator.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
  a condenser configured to condense a vapor into a condensate including an ink carrier oil and water;
  a first chamber configured to receive the condensate, the first chamber having an upper discharge outlet and a lower discharge outlet; and
  a second chamber having an inlet connected to the lower outlet of the first chamber and a second chamber outlet below the upper discharge outlet such that separated ink carrier oil is discharged through the upper outlet, separated water is discharged through the second chamber outlet and such that an interface between the separated ink carrier and the separated water is maintained between the upper discharge outlet and the lower discharge outlet of the first chamber.

2. The apparatus of claim 1 further comprising a fluid conduit connected to the condenser and configured to drop condensate into the first chamber from above the upper discharge outlet.

3. The apparatus of claim 1 further comprising a mixer configured to mix an additive with separated ink carrier oil discharge from the first chamber, the additive including at least one of a high molecular weight oil, a lubricating oil and a defoamer.

4. The apparatus of claim 1 further comprising an additive supply configured to supply the additive to the mixer, wherein the vapor is created by driving off the ink carrier oil from a printer fluid having a first concentration of said at least one of the high molecular weight oil, the lubricating oil and the defoamer and wherein the additive supplied by the supply has a second concentration of said at least one of the high molecular weight oil, the lubricating oil and the defoamer lower than the first concentration.

5. The apparatus of claim 1 further comprising a mixer configured to mix an additive with separated ink carrier oil discharge from the first chamber, the additive including a high molecular weight oil, a lubricating oil and a defoamer.

6. The apparatus of claim 5 further comprising an additive supply configured to supply the additive to the mixer, wherein the vapor is created by driving off the ink carrier oil from a printer fluid having a first concentration of the high molecular weight oil, a first concentration of a lubricating oil and a first concentration of the defoamer and wherein the additive supplied by the supply has a second concentration of the high molecular weight oil lower than the first concentration of the high molecular weight oil, a second concentration of a lubricating oil lower than the first concentration of the lubricating oil and a second concentration of the defoamer lower than the first concentration of the defoamer.

7. The apparatus of claim 1, wherein the upper discharge outlet and the second chamber outlet are configured such that discharge of the oil and the water from the first chamber and the second chamber, respectively, is solely under the force of gravity.

8. A method comprising:
condensing a vapor to form a condensate including an ink carrier oil and water;
separating the ink carrier oil from the water; and
adding an additive to the separated ink carrier oil to form a mixture of the separated ink carrier oil and of the additive; and
adding colorants to the mixture and printing with the mixture and colorants, wherein the vapor is created by driving off the ink carrier oil from a printer fluid including at least one of a high molecular weight oil, a lubricating oil and a defoamer and wherein the additive has a lower concentration of the at least one of the high molecular weight oil, the lubricating oil and the defoamer.

9. The method of claim 8, wherein separating the ink carrier oil from the water comprises:
discharging the condensate into a first chamber having an upper discharge outlet and a lower discharge outlet;
discharging separated water from the first chamber into a second chamber through an inlet of the second chamber connected to the lower outlet of the first chamber;
discharging water from the second chamber through a second chamber outlet below the upper discharge outlet; and
discharging separated ink carrier oil through the upper discharge outlet, wherein an interface between the separated ink carrier and the separated water is automatically maintained between the upper discharge outlet and the lower discharge outlet of the first chamber.

10. The method of claim 8, wherein the additive includes the high molecular weight oil, the lubricating oil and the defoamer.

11. The method of claim 8 wherein the vapor is created by driving off the ink carrier oil from a printer fluid having a first concentration of the high molecular weight oil, a first concentration of the lubricating oil and a first concentration of the defoamer and wherein the additive has a second concentration of the high molecular weight oil lower than the first concentration of the high molecular weight oil, a second concentration of a lubricating oil lower than the first concentration of the lubricating oil and a second concentration of the defoamer lower than the first concentration of the defoamer.

12. The method of claim 8 further comprising cleaning or cooling a surface of a photoconductor with the mixture prior to the addition of colorants to the mixture.

13. An apparatus comprising:
a condenser configured to condense a vapor into a condensate including an ink carrier oil and water;
a separator configured to separate the ink carrier oil and the water from the condensate;
an additive system configured to add an additive to the separated ink carrier oil and to supply a mixture of the ink carrier oil and the additive for reuse, wherein the vapor is created by driving off the ink carrier oil from a printer fluid including at least one of a high molecular weight oil, a lubricating oil and a defoamer and wherein the additive has a lower concentration of the at least one of the high molecular weight oil, the a lubricating oil and the defoamer.

14. The apparatus of claim 13, wherein the separator comprises:
a first chamber configured to receive the condensate, the first chamber having an upper discharge outlet and a lower discharge outlet; and
a second chamber having an inlet connected to the lower outlet of the first chamber and a second chamber outlet below the upper discharge outlet such that separated ink carrier oil is discharged through the upper outlet, separated water is discharged through the second chamber outlet and such that an interface between the separated ink carrier and the separated water is maintained between the upper discharge outlet and the lower discharge outlet of the first chamber.

15. The apparatus of claim 13, wherein the additive includes the high molecular weight oil, the lubricating oil and the defoamer.

16. The apparatus of claim 13 wherein the vapor is created by driving off the ink carrier oil from a printer fluid having a first concentration of the high molecular weight oil, a first concentration of the lubricating oil and a first concentration of the defoamer and wherein the additive has a second concentration of the high molecular weight oil lower than the first concentration of the high molecular weight oil, a second concentration of the lubricating oil lower than the first concentration of the lubricating oil and a second concentration of the defoamer lower than the first concentration of the defoamer.

* * * * *

UNITED STATES PATENT AND TRADEMARK OFFICE
CERTIFICATE OF CORRECTION

| | | |
|---|---|---|
| PATENT NO. | : 7,801,465 B2 | |
| APPLICATION NO. | : 11/830844 | |
| DATED | : September 21, 2010 | |
| INVENTOR(S) | : John A. Thompson et al. | |

It is certified that error appears in the above-identified patent and that said Letters Patent is hereby corrected as shown below:

In column 12, line 62, in Claim 4, delete "claim 1" and insert -- claim 3 --, therefor.

In column 14, line 26, in Claim 13, delete "the a" and insert -- the --, therefor.

Signed and Sealed this
Twelfth Day of April, 2011

David J. Kappos
*Director of the United States Patent and Trademark Office*